United States Patent
Ahmed et al.

(10) Patent No.: US 11,842,176 B2
(45) Date of Patent: Dec. 12, 2023

(54) SYSTEM AND METHOD FOR PERFORMING PARALLEL AND DISTRIBUTED ANALYSIS OF PROGRAM CODE TO GENERATE DEPENDENCY GRAPHS FOR EXECUTING EXTRACT TRANSFORM LOAD TRANSFORMATIONS

(71) Applicant: BANK OF AMERICA CORPORATION, Charlotte, NC (US)

(72) Inventors: Malik Faisal Ahmed, Agoura Hills, CA (US); Manoj S. Daniel, Maharashtra (IN); Sachin Dev, Telangana (IN); Rakesh Reddy Karra, Westlake Village, CA (US); Kushvanth Kondabolu, Oak Park, CA (US); Srinivasa Varada Pawan Kumar Kodakandla Sesha, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 159 days.

(21) Appl. No.: 17/525,035

(22) Filed: Nov. 12, 2021

(65) Prior Publication Data

US 2023/0153086 A1 May 18, 2023

(51) Int. Cl.
*G06F 8/41* (2018.01)

(52) U.S. Cl.
CPC .............. *G06F 8/433* (2013.01); *G06F 8/427* (2013.01)

(58) Field of Classification Search
CPC ...................................................... G06F 8/433
USPC ....................................................... 717/143
See application file for complete search history.

(56) References Cited

U.S. PATENT DOCUMENTS

| | | | | |
|---|---|---|---|---|
| 7,478,142 | B1* | 1/2009 | Veditz | G06F 9/445 |
| | | | | 709/218 |
| 8,442,935 | B2* | 5/2013 | Cottle | G06F 16/254 |
| | | | | 707/975 |
| 8,527,971 | B2* | 9/2013 | Helovuo | G06F 8/456 |
| | | | | 717/149 |
| 8,745,579 | B2* | 6/2014 | Johnson, Jr. | G06F 8/38 |
| | | | | 717/106 |
| 8,910,134 | B2* | 12/2014 | Hong | G06F 8/443 |
| | | | | 717/157 |

(Continued)

FOREIGN PATENT DOCUMENTS

CN 113204593 A * 8/2021

OTHER PUBLICATIONS

Jesus Sanchez Cuadrado et al. "Efficient Execution of ATL Model Transformations Using Static Analysis and Parallelism"; IEEE Transactions on Software Engineering, vol. 48, No. 4, Apr. 2022.*

*Primary Examiner* — Francisco J Aponte
(74) *Attorney, Agent, or Firm* — Moore & Van Allen PLLC; Nicholas C. Russell (57) ABSTRACT

Embodiments of the present invention provide a system for performing parallel and distributed analysis of program code to generate directed graphs for executing extract transform load transformations. The system is configured for identifying that a user has initiated a request for analysis of a program code, via a compiler, extracting a syntax tree associated with the program code from the compiler, performing parallel and distributed analysis of the program code based on the syntax tree, generating a directed graph based on performing parallel and distributed analysis of the program code, and storing the directed graph in a cache memory.

20 Claims, 6 Drawing Sheets

(56) References Cited

U.S. PATENT DOCUMENTS

| | | | | |
|---|---|---|---|---|
| 8,949,806 B1* | 2/2015 | Lee | G06F 8/445 | |
| | | | 716/135 | |
| 9,182,957 B2* | 11/2015 | Craymer | G06F 8/456 | |
| 9,223,815 B2* | 12/2015 | Teraguchi | G06F 11/0793 | |
| 9,229,696 B2* | 1/2016 | Box | G06F 8/437 | |
| 9,411,558 B2* | 8/2016 | Hutchison | G06F 3/0673 | |
| 9,471,546 B2* | 10/2016 | Speek | G06F 40/00 | |
| 9,678,720 B2* | 6/2017 | Hale | G06F 11/3668 | |
| 10,209,963 B2* | 2/2019 | Hutchison | G06F 3/0631 | |
| 10,331,432 B2* | 6/2019 | Oliver | G06F 8/65 | |
| 10,585,710 B2* | 3/2020 | Smith | G06F 8/36 | |
| 10,678,910 B2* | 6/2020 | Ng | G06F 21/54 | |
| 11,023,426 B1* | 6/2021 | Tkachuk | G06F 16/1873 | |
| 11,057,500 B2* | 7/2021 | Aragón | H04L 67/1001 | |
| 11,537,609 B2* | 12/2022 | Dwars | G06F 16/3332 | |
| 11,669,311 B2* | 6/2023 | Rao | G06F 8/433 | |
| | | | 717/144 | |
| 2013/0125097 A1* | 5/2013 | Ebcioglu | G06F 30/323 | |
| | | | 717/136 | |
| 2013/0297579 A1* | 11/2013 | Andrew | G06F 8/71 | |
| | | | 707/698 | |
| 2014/0047413 A1* | 2/2014 | Sheive | H04L 65/403 | |
| | | | 717/110 | |
| 2015/0186132 A1* | 7/2015 | Oliveri | G06F 8/34 | |
| | | | 717/120 | |
| 2015/0215375 A1* | 7/2015 | Hundt | G06F 8/61 | |
| | | | 709/203 | |
| 2016/0070813 A1* | 3/2016 | Unter Ecker | G06F 16/958 | |
| | | | 715/234 | |
| 2016/0103586 A1* | 4/2016 | Greenberg | G06Q 30/06 | |
| | | | 715/739 | |
| 2016/0149987 A1* | 5/2016 | Thompson | H04L 69/08 | |
| | | | 709/217 | |
| 2016/0321055 A1* | 11/2016 | Mihalcea | G06F 8/71 | |
| 2017/0046135 A1* | 2/2017 | Hazarika | G06F 9/541 | |
| 2017/0097814 A1* | 4/2017 | Nørskov | G06F 8/447 | |
| 2017/0109142 A1* | 4/2017 | Kaushal | H04W 4/50 | |
| 2018/0137035 A1* | 5/2018 | Magre | G06F 11/3692 | |
| 2018/0150528 A1* | 5/2018 | Shah | G06F 16/254 | |
| 2019/0065217 A1* | 2/2019 | Girdhar | G06F 9/44505 | |
| 2019/0095196 A1* | 3/2019 | Anderson | G06F 8/71 | |
| 2019/0138582 A1* | 5/2019 | Cudich | G06F 40/14 | |
| 2019/0179620 A1* | 6/2019 | Lowery | G06F 11/0709 | |
| 2019/0188006 A1* | 6/2019 | Ritter | G06F 8/433 | |
| 2019/0243629 A1* | 8/2019 | Gass | G06F 8/40 | |
| 2019/0317982 A1* | 10/2019 | Chitale | G06F 16/9566 | |
| 2020/0019414 A1* | 1/2020 | Byard | G06F 9/44526 | |
| 2020/0125345 A1* | 4/2020 | Belagali | G06F 11/368 | |
| 2020/0192662 A1* | 6/2020 | Hu | G06F 8/76 | |
| 2020/0218516 A1* | 7/2020 | Hari Krishnan | G06F 9/45529 | |
| 2020/0249921 A1* | 8/2020 | Giandomenico | G06F 8/10 | |
| 2020/0257515 A1* | 8/2020 | Totale | G06F 8/65 | |
| 2020/0264848 A1* | 8/2020 | Stober | G06F 8/40 | |
| 2020/0278845 A1* | 9/2020 | Ravid | G06F 8/70 | |

* cited by examiner

SYSTEM AND METHOD FOR PERFORMING PARALLEL AND DISTRIBUTED ANALYSIS OF PROGRAM CODE TO GENERATE DEPENDENCY GRAPHS FOR EXECUTING EXTRACT TRANSFORM LOAD TRANSFORMATIONS

BACKGROUND

Conventional systems do not have the capability to generate and maintain metadata associated with extract transform load transformations. As such, there exists a need for a system that accurately generates and maintains metadata associated with extract transform load transformations.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for performing parallel and distributed analysis of program code to generate directed graphs for executing extract transform load transformations. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies that a user has initiated a request for analysis of a program code, via a compiler interface associated with a compiler, extracts a syntax tree associated with the program code from the compiler, performs parallel and distributed analysis of the program code based on the syntax tree, generates a directed graph based on performing parallel and distributed analysis of the program code, and stores the directed graph in a cache memory.

In some embodiments, the present invention identifies that the user has initiated a second request for analysis of the program code, via the compiler interface associated with the compiler, determines, via a smart detection module, that the cached directed graph stored in the cache memory is valid and loads the cached directed graph stored in the cache memory to perform transformation of data associated with the program code.

In some embodiments, the present invention identifies that the user has initiated a second request for analysis of the program code, via the compiler interface associated with the compiler, determines, via a smart detection module, that the cached directed graph stored in the cache memory is not valid, extracts syntax tree associated with the program code from the compiler, performs parallel and distributed analysis of the program code based on the syntax tree, updates the directed graph based on performing parallel and distributed analysis of the program code, and uses the updated directed graph to perform transformation of data associated with the program code.

In some embodiments, the present invention performs parallel and distributed analysis of the program code based on scanning the program code to identify classes associated with calculations used in transformation of data associated with the program code and scanning the program code associated with the classes in parallel to identify the calculations, one or more dependencies, and one or more cyclic dependencies, wherein the generated directed graph is based on the calculations, the one or more dependencies, and the one or more cyclic dependencies.

In some embodiments, the present invention performs the transformation of data associated with the program code in parallel based on the identified calculations, the one or more dependencies, and the one or more cyclic dependencies.

In some embodiments, the present invention displays results associated with the transformation of data to one or more users.

In some embodiments, the present invention optimizes execution of one or more transformation operations associated with the transformation of data based on the one or more dependencies and the one or more cyclic dependencies.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that develops one or more applications for performing one or more organizational activities associated with the entity or a third party entity. In some embodiments, the entity may be a financial institution which may include herein may include any financial institutions such as commercial banks, thrifts, federal and state savings banks, savings and loan associations, credit unions, investment companies, insurance companies and the like.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access, develop, manage, maintain, test, and/or use one or more applications provided by the entity and/or the system of the present invention. In some embodiments, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Multiple applications exists within an entity that are configured for performing one or more organizational operations associated with the entity and data associated with one application may be consumed by another application to execute and perform the one or more organizational operations. However, format requirements associated with the multiple applications may be different, thereby requiring transformation of data via Extract Transform Load (ETL) transformations. Extract Transform Load (ETL) transformations are performed based on metadata associated with each the applications within the entity, where the metadata provides lineage traceability and information associated with calculations related to transformation of data based on the requirements (e.g., format requirements) of the applications. No system exists in place to generate the metadata associated with the applications and maintain the metadata to keep it up to date with constant changes to the applications. Inaccurate metadata may result in data transformation errors and also miscalculation of order of execution of ETL transformations between applications, thereby reducing processing efficiency of computing systems hosting the entity applications. Additionally, metadata associated with the applications may be used by other entity users for future application development and in such instances, inaccurate metadata will result in defective applications that need to be redeveloped after identifying that the metadata relied upon for development is inaccurate. As such, there exists a need for a system that accurately generates and maintains metadata associated with extract transform load transformations. The system of the present invention solves these technical problems as discussed in detail below.

Figure 1:
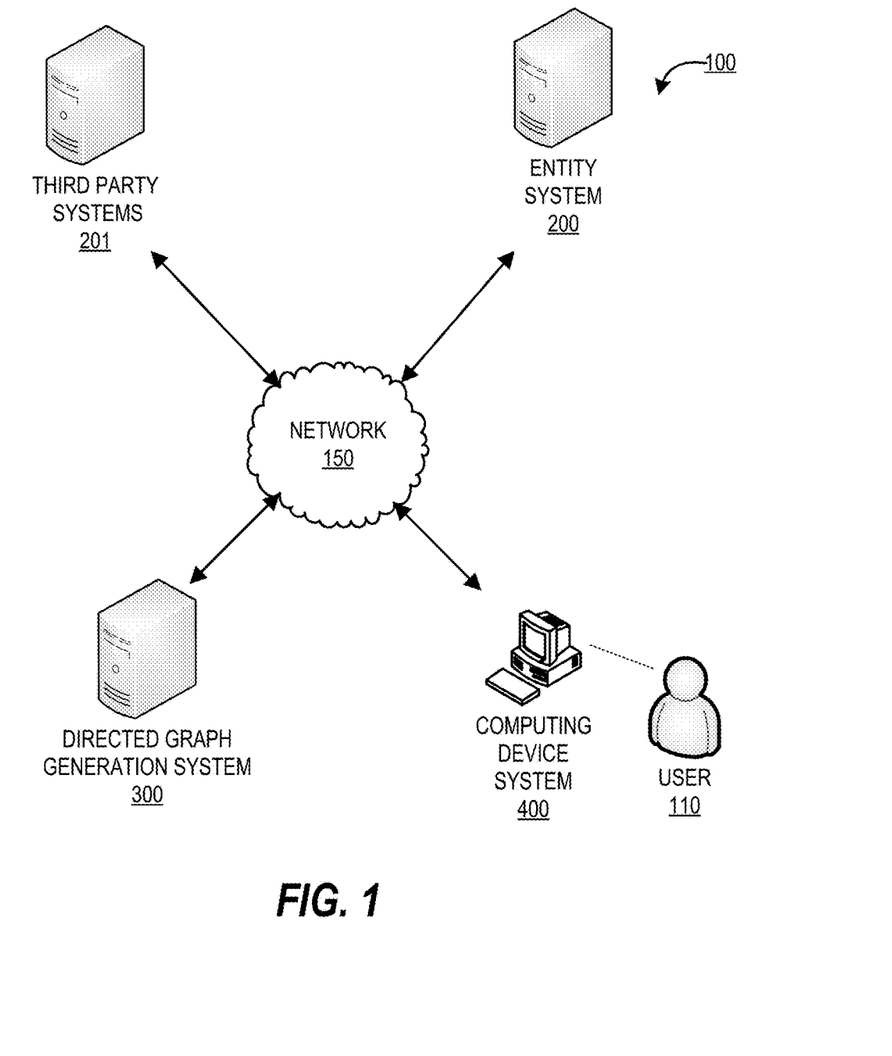
FIG. 1 provides a block diagram illustrating a system environment for performing parallel and distributed analysis of program code to generate directed graphs for executing extract transform load transformations, in accordance with an embodiment of the invention.

FIG. 1 provides a block diagram illustrating a system environment 100 for performing parallel and distributed analysis of program code to generate directed graphs for executing extract transform load transformations, in accordance with an embodiment of the invention. As illustrated in FIG. 1, the environment 100 includes a directed graph generation system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, managers, application testers, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that develops and/or utilizes one or more entity resources to perform one or more organizational activities. The one or more third party systems 201 may be systems that facilitate any external third party applications that the entity may use to support, process, and/or develop the one or more applications.

The directed graph generation system 300 is a system of the present invention for performing one or more process steps described herein. In some embodiments, the directed graph generation system 300 may be an independent system. In some embodiments, the directed graph generation system 300 may be a part of the entity system 200.

The directed graph generation system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the directed graph generation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the directed graph generation system 300, and/or entity system 200 across the network 150.

Figure 2:
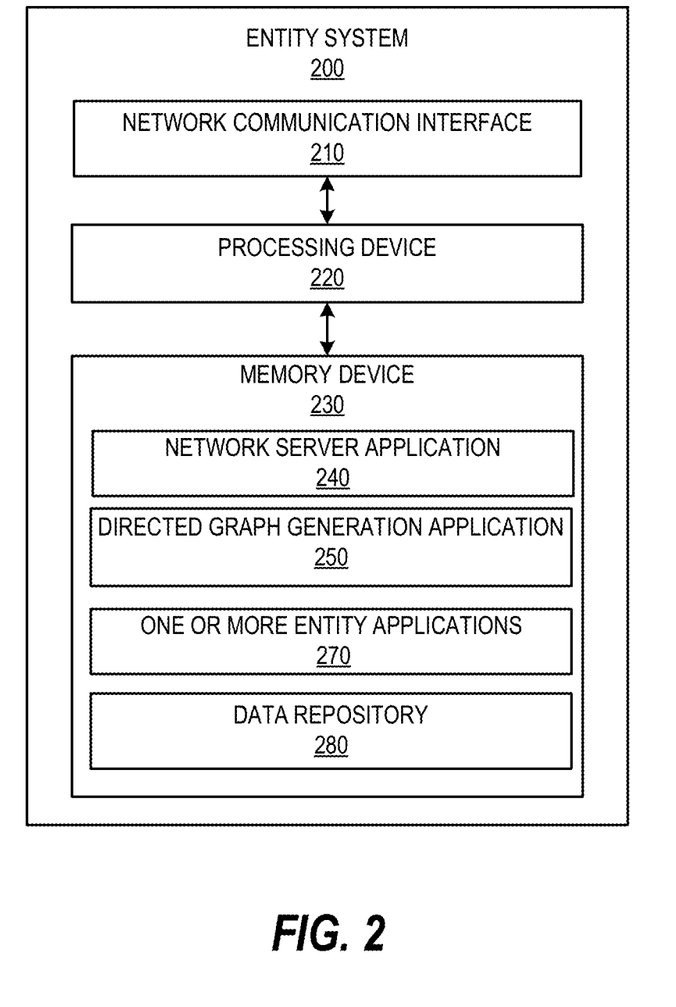
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a directed graph generation application 250, one or more entity applications 270, and a data repository 280 comprising historical activity data associated with the entity and data accessed, retrieved, and/or computed by the entity system 200. The one or more entity applications 270 may be any applications developed, supported, maintained, utilized, and/or controlled by the entity. The computer-executable program code of the network server application 240, the directed graph generation application 250, the one or more entity application 270 to perform certain logic, data-extraction, and data-storing functions of the entity system 200 described herein, as well as communication functions of the entity system 200.

The network server application 240, the directed graph generation application 250, and the one or more entity applications 270 are configured to store data in the data repository 280 or to use the data stored in the data repository 280 when communicating through the network communication interface 210 with the directed graph generation system 300, and/or the computing device system 400 to perform one or more process steps described herein. In some embodiments, the entity system 200 may receive instructions from the directed graph generation system 300 via the directed graph generation application 250 to perform certain operations. The directed graph generation application 250 may be provided by the directed graph generation system 300. The one or more entity applications 270 may be any of the applications used, created, modified, facilitated, developed, and/or managed by the entity system 200.

Figure 3:
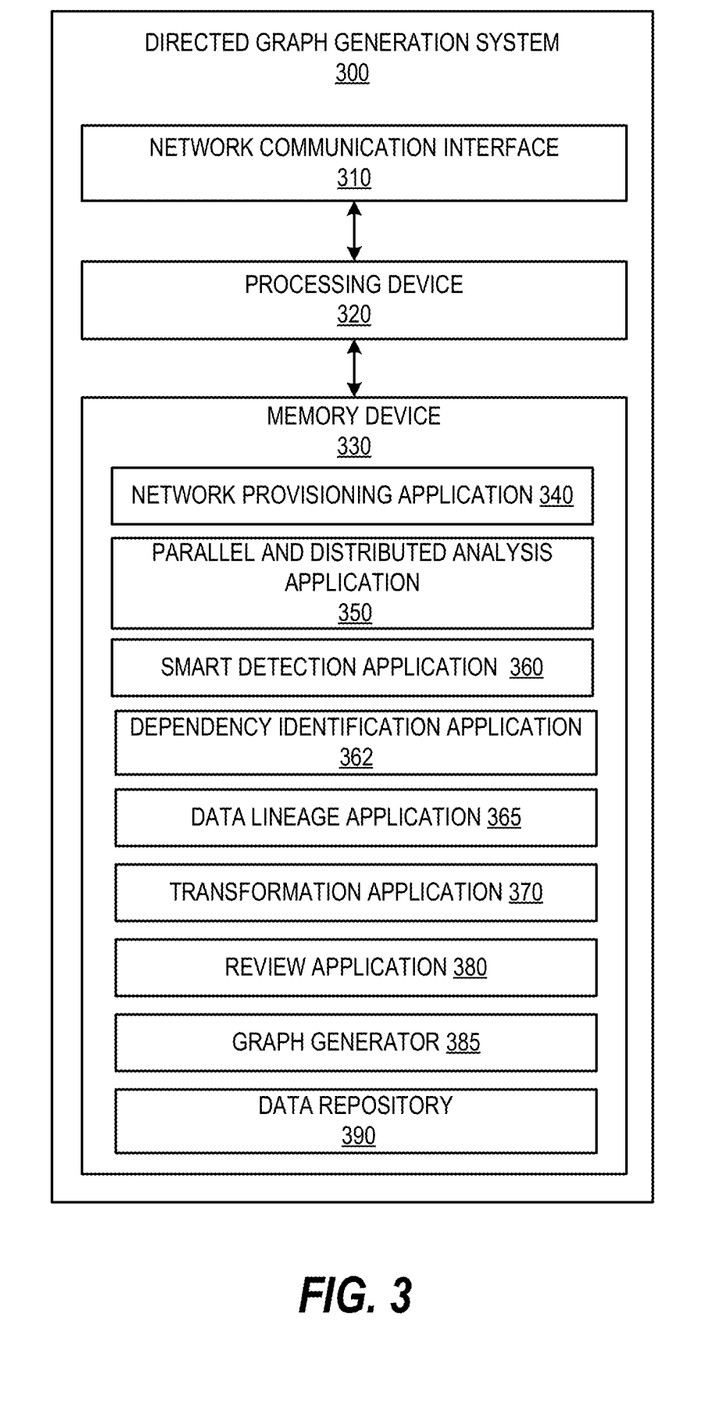
FIG. 3 provides a block diagram illustrating a directed graph generation system 300 of FIG. 1, in accordance with an embodiment of the invention.

FIG. 3 provides a block diagram illustrating the directed graph generation system 300 in greater detail, in accordance with embodiments of the invention. As illustrated in FIG. 3, in one embodiment of the invention, the directed graph generation system 300 includes one or more processing devices 320 operatively coupled to a network communication interface 310 and a memory device 330. In certain embodiments, the directed graph generation system 300 is operated by an entity, such as a financial institution. In other embodiments, the directed graph generation system 300 is operated by a non-financial institution. In some embodiments, the directed graph generation system 300 is owned or operated by the entity of the entity system 200. In some embodiments, the directed graph generation system 300 may be an independent system. In alternate embodiments, the directed graph generation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the directed graph generation system 300 described herein. For example, in one embodiment of the directed graph generation system 300, the memory device 330 includes, but is not limited to, a network provisioning application 340, a parallel and distributed analysis application 350, a smart detection module 360, a dependency identification application 362, a data lineage application 365, a transformation application 370, a review application 380, a graph generator 385, and a data repository 390 comprising any data processed or accessed by one or more applications in the memory device 330. The computer-executable program code of the network provisioning application 340, the parallel and distributed analysis application 350, the smart detection module 360, the dependency identification application 362, the data lineage application 365, the transformation application 370, the review application 380, and the graph generator 385 may instruct the processing device 320 to perform certain logic, data-processing, and data-storing functions of the directed graph generation system 300 described herein, as well as communication functions of the directed graph generation system 300.

The network provisioning application 340, the parallel and distributed analysis application 350, the smart detection module 360, the dependency identification application 362, the data lineage application 365, the transformation application 370, the review application 380, and the graph generator 385 are configured to invoke or use the data in the data repository 390 when communicating through the network communication interface 310 with the entity system 200, and/or the computing device system 400. In some embodiments, the network provisioning application 340, the parallel and distributed analysis application 350, the smart detection module 360, the dependency identification application 362, the data lineage application 365, the transformation application 370, the review application 380, and the graph generator 385 may store the data extracted or received from the entity system 200, and the computing device system 400 in the data repository 390. In some embodiments, the network provisioning application 340, the parallel and distributed analysis application 350, the smart detection module 360, the dependency identification application 362, the data lineage application 365, the transformation application 370, the review application 380, and the graph generator 385 may be a part of a single application.

Figure 4:
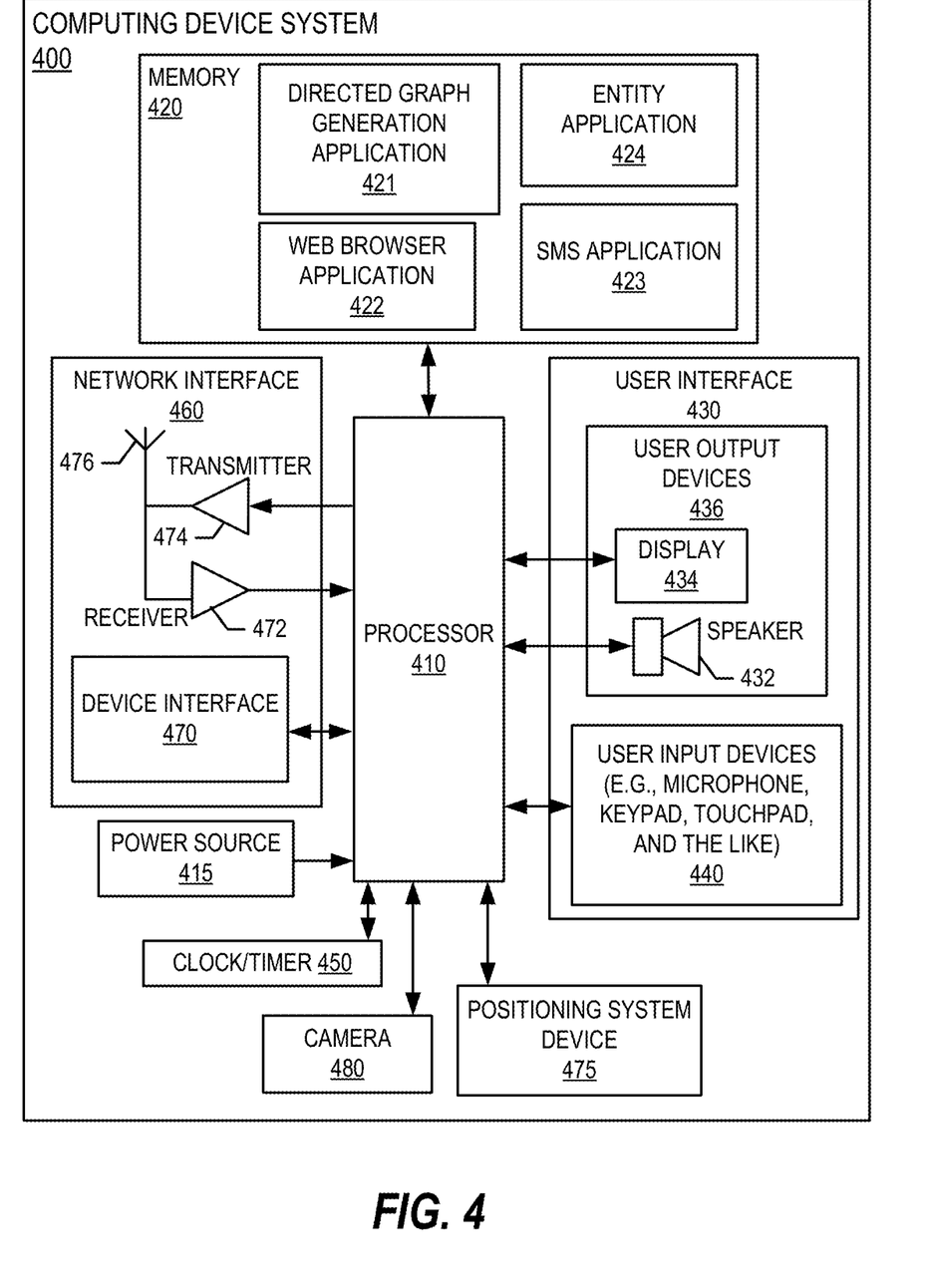
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a directed graph generation application 421, entity application 424. These applications also typically instructions to a graphical user interface (GUI) on the display 430 that allows the user 110 to interact with the entity system 200, the directed graph generation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the directed graph generation application 421 provided by the directed graph generation system 300 allows the user 110 to access the directed graph generation system 300. In some embodiments, the entity application 424 provided by the entity system 200 and the directed graph generation application

421 allow the user 110 to access the functionalities provided by the directed graph generation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
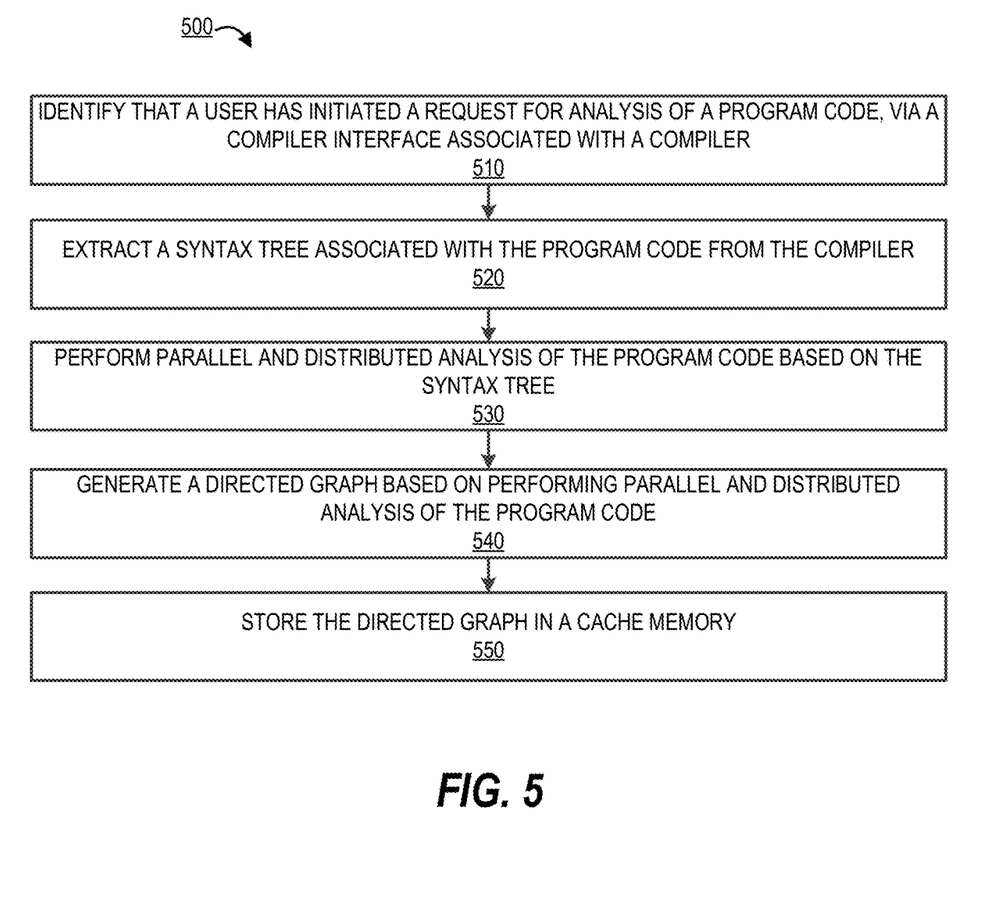
FIG. 5 provides a process flow for performing parallel and distributed analysis of program code to generate directed graphs for executing extract transform load transformations, in accordance with an embodiment of the invention.

FIG. 5 provides a process flow for performing parallel and distributed analysis of program code to generate directed graphs for executing extract transform load transformations, in accordance with an embodiment of the invention. As shown in block 510, the system identifies that a user has initiated request for analysis of a program code, via a compiler interface associated with a compiler. A user may develop a program code associated with an Extract Transform Load (ETL) transformation operations and may compile the program code using a compiler and may request for analysis of a program code via a compiler interface associated with the compiler. In some embodiments, the system may automatically trigger analysis of the program code based on identifying that the user has compiled the program code via the compiler. The compiler may be any compiler used for compiling the program code written in a specific programming language. In some embodiments, the system may continuously monitor one or more user computing systems and/or one or more compilers installed on the one or more user computing systems to identify a trigger associated with initiation of compilation of one or more program codes that are being developed.

As shown in block 520, the system extracts a syntax tree associated with the program code from the compiler. Once the compilation of the program code is complete, a file with syntax tree associated with the program code is generated by the compiler and the system extracts the syntax tree from the file. In some embodiments, the system may have an internal compiler for compiling the one or more program codes that are being developed by the one or more users on one or more user computing systems.

As shown in block 530, the system performs parallel and distributed analysis of the program code based on the syntax tree. Parallel and distributed analysis of the program code comprises scanning the entire syntax tree of the program code to identify calculations related to transformation of data associated with the program code, one or more dependencies, and one or more cyclic dependencies. In some embodiments, the system identifies one or more classes based on scanning the program code. Once the one or more classes are identified, the system scans the one or more classes in depth, where scanning of the one or more classes is performed in parallel. The system optimizes the scanning of the one or more classes to improve the overall efficiency of the process. Based on scanning the one or more classes, the system identifies the calculations, the one or more dependencies, and the one or more cyclic dependencies. For example, the system may scan the program code to identify that an attribute 'C' is dependent on attribute 'A' and attribute 'B.' In some embodiments, the system may also determine the best mode of performing the one or more calculations. In other words, the system performs the transformation of data associated with the program code in parallel based on the identified calculations, the one or more dependencies, and the one or more cyclic dependencies. The system also optimizes execution of one or more transformation operations associated with the transformation of data based on the one or more dependencies and the one or more cyclic dependencies. Continuing with the previous example, the system may calculate attribute 'A' and attribute 'B' in parallel before calculating the attribute 'C.' It should be understood that the examples described herein are for explanatory purposes only and in any way do not delineate the scope of the invention. The system based on the one or more dependencies and the one or more cyclic dependencies, determines order of execution of one or more transformation operations associated with the transformation of data.

As shown in block 540, the system generates a directed graph based on performing parallel and distributed analysis of the program code. The directed graph comprises metadata associated with the one or more program codes of one or more entity applications of the entity. The directed graph may be a dependency graph that illustrates the lineage identified based on performing parallel and distributed analysis of the program code. In some embodiments, the system may also display calculations associated with each of the nodes of the directed graph.

As shown in block 550, the system stores the directed graph in a cache memory. Cache memory may be any memory used to temporarily stored data that can be accessed instantly for processing. Storing the directed graph in the cache memory also improves the overall efficiency of the process.

Figure 6:
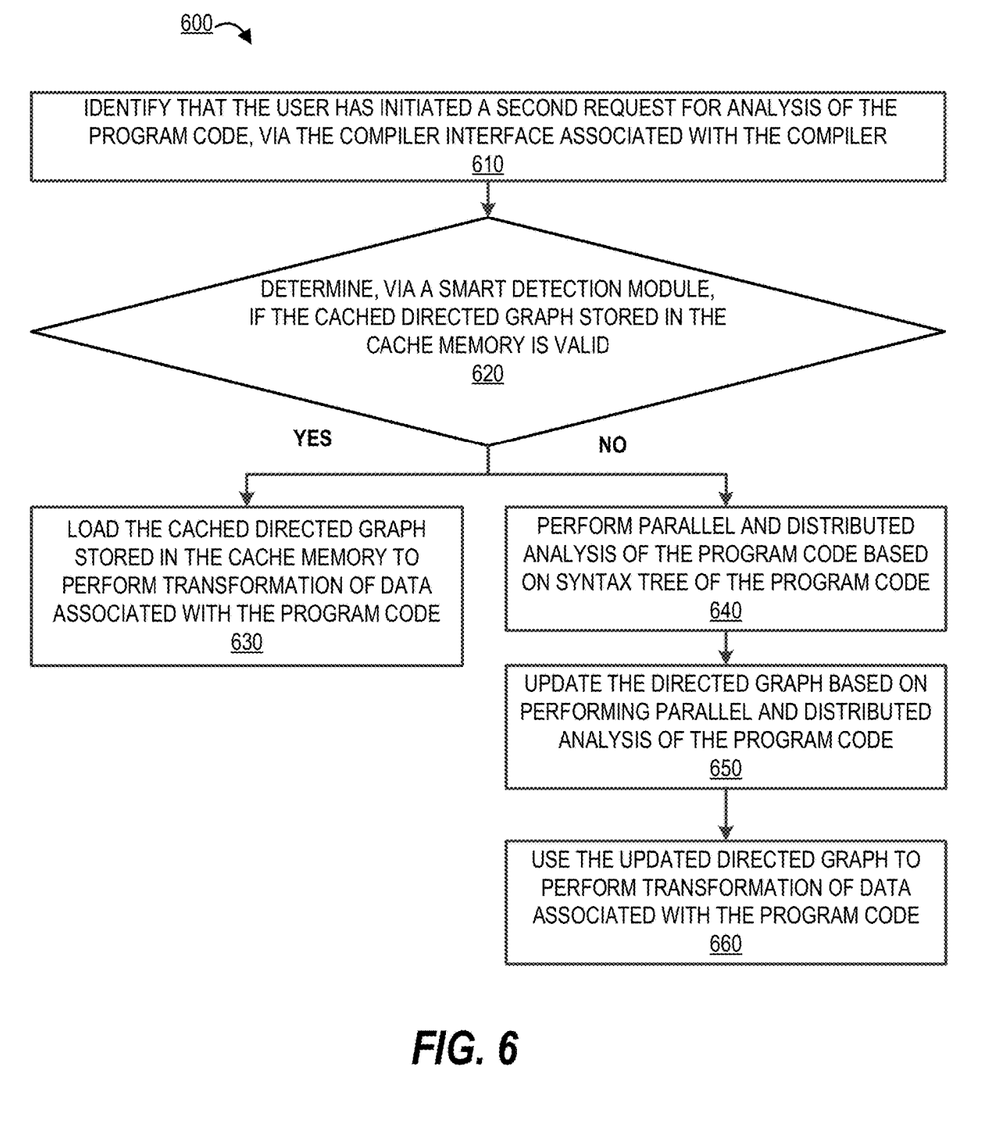
FIG. 6 provides a process flow for determining validity of cached directed graphs for performing transformation of data, in accordance with an embodiment of the invention.

FIG. 6 provides a process flow for determining validity of cached directed graphs for performing transformation of data, in accordance with an embodiment of the invention. Once the directed graph is stored in cached memory, the directed graph may not be valid if the user makes any changes to the program code. The process flow 600 illustrates the method of validating the directed graphs stored in the cache memory.

As shown in block 610, the system identifies that the user has initiated a second request for analysis of the program code, via the compiler. The system may identify the trigger associated with compilation of the program code as explained above in block 510. In some embodiments, the system may automatically identify the trigger to initiate the process flow based on identifying that the user has compiled the program code via the compiler. For example, a user may make changes to a previously analyzed program code and may compile the program code. The system identifies that the user has initiated compilation of the program code and initiates the process flow 600.

As shown in block 620, the system determines, via a smart detection module, if the cached directed graph stored in the cache memory is valid. In some embodiments, the smart detection module of the system determines whether the cache memory is valid or not based on identifying timestamp associated with the program code that is being compiled with the timestamp of the program code that was compiled previously. Timestamp may be associated with when the program code was saved or submitted by the user in a development environment. In some embodiments, the smart detection module of the system determines whether the cache memory is valid or not based on comparing the previously compiled code with the current compiled code to identify any changes. In some embodiments, the smart detection module of the system determines whether the cache memory is valid or not based on determining version number associated with the program code that is being compiled. For example, if the version number associated with the previously compiled program code is different from the version number associated with the program code that is being currently compiled, the system determines that the directed graph stored in the cache memory is no longer valid. In some embodiments, the smart detection module of the system determines whether the cache memory is valid or not based on comparing hash values associated with files storing the program code. For example, if the hash value associated with the file comprising the program code that was analyzed previously is same as the hash value associated with the file that is being analyzed currently, the system determines that the directed graph stored in the cache memory is valid. In some embodiments, the system may use any combination of the above methods to determine validity of the cached directed graph.

If the system determines that the cached directed graph is valid, the process flow proceeds to block 630. As shown in block 630, the system loads the cached directed graph stored in the cache memory to perform transformation of data associated with the program code.

If the system determines that the cached directed graph is not valid, the process flow proceeds to execute process flow described in blocks 630 through 660. As shown in block 640, the system performs parallel and distributed analysis of the program code. The system may extract the syntax tree associated with the program code again after determining that the cached directed graph is not valid. As shown in block 650, the system updates the directed graph based on performing parallel and distributed analysis of the program code based on the syntax tree. As shown in block 660, the system uses the updated directed graph to perform transformation of data associated with the program code. The system after performing transformation of data, displays the results associated with the transformation of data to one or more users via a graphical user interface.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for performing parallel and distributed analysis of program code to generate directed graphs for executing extract transform load transformations, the system comprising:
    at least one network communication interface;
    at least one non-transitory storage device; and
    at least one processing device coupled to the at least one non-transitory storage device and the at least one network communication interface, wherein the at least one processing device is configured to:
    identify that a user has initiated request for analysis of a program code, via a compiler interface associated with a compiler;
    extract a syntax tree associated with the program code from the compiler;
    perform parallel and distributed analysis of the program code based on the syntax tree;
    generate a directed graph based on performing parallel and distributed analysis of the program code, wherein the directed graph comprises metadata associated with the program code and calculations associated with each of one or more nodes associated with the directed graph;
    store the directed graph in a cache memory,
    identify that the user has initiated a second request for analysis of the program code, via the compiler interface;
    determine, via a smart detection module, if cached directed graph stored in the cache memory is valid; and
    allow or deny usage of the cached directed graph for performing transformation of data associated with the program code based on determining if the cached directed graph is valid.

2. The system of claim 1, wherein the at least one processing device is configured to:
    determine, via the smart detection module, that cached directed graph stored in the cache memory is valid; and
    load the cached directed graph stored in the cache memory to perform the transformation of data associated with the program code.

3. The system of claim 1, wherein the at least one processing device is configured to:
    determine, via the smart detection module, that cached directed graph stored in the cache memory is not valid;
    extract the syntax tree associated with the program code from the compiler;
    perform parallel and distributed analysis of the program code based on the syntax tree;
    update the directed graph based on performing parallel and distributed analysis of the program code; and
    use the updated directed graph to perform the transformation of data associated with the program code.

4. The system of claim 1, wherein the at least one processing device is configured to perform the parallel and distributed analysis of the program code based on:
    scanning the program code to identify classes associated with the calculations used in the transformation of data associated with the program code; and
    scanning the program code associated with the classes in parallel to identify the calculations, one or more dependencies, and one or more cyclic dependencies, wherein the generated directed graph is based on the calculations, the one or more dependencies, and the one or more cyclic dependencies.

5. The system of claim 4, wherein the at least one processing device is configured to perform the transformation of data associated with the program code in parallel based on the identified calculations, the one or more dependencies, and the one or more cyclic dependencies.

6. The system of claim 5, wherein the at least one processing device is configured to display results associated with the transformation of data to one or more users.

7. The system of claim 4, wherein the at least one processing device is configured to optimize execution of one or more transformation operations associated with the transformation of data based on the one or more dependencies and the one or more cyclic dependencies.

8. A computer program product for performing parallel and distributed analysis of program code to generate directed graphs for executing extract transform load transformations, the computer program product comprising a non-transitory computer-readable storage medium having computer executable instructions for causing a computer processor to perform the steps of:
    identifying that a user has initiated a request for analysis of a program code, via a compiler interface associated with a compiler;
    extracting a syntax tree associated with the program code from the compiler;
    performing parallel and distributed analysis of the program code based on the syntax tree;
    generating a directed graph based on performing parallel and distributed analysis of the program code, wherein the directed graph comprises metadata associated with the program code and calculations associated with each of one or more nodes associated with the directed graph;
    storing the directed graph in a cache memory;
    identifying that the user has initiated a second request for analysis of the program code, via the compiler interface;
    determining, via a smart detection module, if cached directed graph stored in the cache memory is valid; and allowing or denying usage of the cached directed graph for performing transformation of data associated with the program code based on determining if the cached directed graph is valid.

9. The computer program product of claim 8, wherein the computer executable instructions cause the computer processor to perform the steps of:
   determining, via the smart detection module, that cached directed graph stored in the cache memory is valid; and
   loading the cached directed graph stored in the cache memory to perform the transformation of data associated with the program code.

10. The computer program product of claim 8, wherein the computer executable instructions cause the computer processor to perform the steps of:
    determining, via the smart detection module, that cached directed graph stored in the cache memory is not valid;
    extract the syntax tree associated with the program code from the compiler;
    performing parallel and distributed analysis of the program code based on the syntax tree;
    updating the directed graph based on performing parallel and distributed analysis of the program code; and
    using the updated directed graph to perform the transformation of data associated with the program code.

11. The computer program product of claim 8, wherein the computer executable instructions cause the computer processor to perform the step of performing the parallel and distributed analysis of the program code based on:
    scanning the program code to identify classes associated with the calculations used in the transformation of data associated with the program code; and
    scanning the program code associated with the classes in parallel to identify the calculations, one or more dependencies, and one or more cyclic dependencies, wherein the generated directed graph is based on the calculations, the one or more dependencies, and the one or more cyclic dependencies.

12. The computer program product of claim 11, wherein the computer executable instructions cause the computer processor to perform the step of performing the transformation of data associated with the program code in parallel based on the identified calculations, the one or more dependencies, and the one or more cyclic dependencies.

13. The computer program product of claim 12, wherein the computer executable instructions cause the computer processor to perform the step of displaying results associated with the transformation of data to one or more users.

14. The computer program product of claim 11, wherein the computer executable instructions cause the computer processor to perform the step of optimizing execution of one or more transformation operations associated with the transformation of data based on the one or more dependencies and the one or more cyclic dependencies.

15. A computer implemented method for performing parallel and distributed analysis of program code to generate directed graphs for executing extract transform load transformations, wherein the method comprises:
    identifying that a user has initiated a request for analysis of a program code, via a compiler interface associated with a compiler;
    extracting a syntax tree associated with the program code from the compiler;
    performing parallel and distributed analysis of the program code based on the syntax tree;
    generating a directed graph based on performing parallel and distributed analysis of the program code, wherein the directed graph comprises metadata associated with the program code and calculations associated with each of one or more nodes associated with the directed graph;
    storing the directed graph in a cache memory;
    identifying that the user has initiated a second request for analysis of the program code, via the compiler interface;
    determining, via a smart detection module, if cached directed graph stored in the cache memory is valid; and
    allowing or denying usage of the cached directed graph for performing transformation of data associated with the program code based on determining if the cached directed graph is valid.

16. The computer implemented method of claim 15, wherein the method comprises:
    determining, via the smart detection module, that cached directed graph stored in the cache memory is valid; and
    loading the cached directed graph stored in the cache memory to perform the transformation of data associated with the program code.

17. The computer implemented method of claim 15, wherein the method comprises:
    determining, via a smart detection module, that cached directed graph stored in the cache memory is not valid;
    extract the syntax tree associated with the program code from the compiler;
    performing parallel and distributed analysis of the program code based on the syntax tree;
    updating the directed graph based on performing parallel and distributed analysis of the program code; and
    using the updated directed graph to perform the transformation of data associated with the program code.

18. The computer implemented method of claim 15, wherein performing the parallel and distributed analysis of the program code comprises:
    scanning the program code to identify classes associated with the calculations used in the transformation of data associated with the program code; and
    scanning the program code associated with the classes in parallel to identify the calculations, one or more dependencies, and one or more cyclic dependencies, wherein the generated directed graph is based on the calculations, the one or more dependencies, and the one or more cyclic dependencies.

19. The computer implemented method of claim 18, wherein the method further comprises performing the transformation of data associated with the program code in parallel based on the identified calculations, the one or more dependencies, and the one or more cyclic dependencies.

20. The computer implemented method of claim 18, wherein the method further comprises displaying results associated with the transformation of data to one or more users.

* * * * *